US007065495B1

(12) United States Patent
Lundgren (10) Patent No.: US 7,065,495 B1
(45) Date of Patent: Jun. 20, 2006

(54) METHOD AND APPARATUS FOR PREVENTING OLIGOPOLY COLLUSION

(76) Inventor: Carl Allin Lundgren, 2811 Bynan Dr., #208, Ypsilanti, MI (US) 48197

( * ) Notice: Subject to any disclaimer, the term of this patent is extended or adjusted under 35 U.S.C. 154(b) by 0 days.

(21) Appl. No.: 08/093,516

(22) Filed: Jul. 16, 1993

Related U.S. Application Data (63) Continuation of application No. 07/954,795, filed on Sep. 30, 1992, now abandoned, which is a continuation of application No. 07/794,791, filed on Nov. 19, 1991, now abandoned, which is a continuation of application No. 07/649,217, filed on Jan. 25, 1991, now abandoned, which is a continuation of application No. 07/277,142, filed on Nov. 29, 1988, now abandoned.

(51) Int. Cl.
*G06Q 99/00* (2006.01)

(52) U.S. Cl. .......................................... 705/11; 705/14
(58) Field of Classification Search ................ 364/401; 705/1, 11, 35, 412, 500, 10, 14
See application file for complete search history.

(56) References Cited

U.S. PATENT DOCUMENTS 4,346,442 A   8/1982   Musmanno

OTHER PUBLICATIONS

Record, Eugene E. and Tynan, Mary Ann. Incentive Fees: The Basic Issues. Financial Analysts Journal, Jan.-Feb., 1987, pp. 39-43.*
Aron, "Ability, Moral Hazard, Firm Size, and Diversification," Rand Journal of Economics, Spring, vol. 19, No. 1, pp. 72-87 (1988).
Bishop, "Duopoly: Collusion or Warfare?", American Economic Review, Dec., vol. 50, pp. 933-961 (1960).
Donaldson et al., "Decentralized Control of a Socialist Industry," Canadian Journal of Economics, vol. 17, No. 1, Feb., pp. 99-110 (1984).
Fershtman et al., "Equilibrium Incentives in Oligopoly," American Economic Review, Dec., vol. 77, No. 5, pp. 927-940 (1987).
Holmstrom, "Moral Hazard in Teams," Bell Journal of Economics, Autumn, vol. 13, No. 2, pp. 324-340 (1982).
Jones, "Notes on Oligopoly: Rival Behavior and Efficiency," Bell Journal of Economics, Autumn, vol. 11, No. 2, pp. 709-714 (1980).

(Continued)

*Primary Examiner*—Susanna M. Diaz
(74) *Attorney, Agent, or Firm*—Watts Hoffmann Co., LPA (57) ABSTRACT

A method and apparatus for reducing incentives for oligopolistic collusion comprises making managerial compensation dependent on relative profits rather than absolute profits. Since the managers of the firms in the industry are thereby placed in a zero-sum game, their compensation will be totally insensitive to gains in absolute profits resulting from collusion.

15 Claims, 2 Drawing Sheets

OTHER PUBLICATIONS

Milgrom et al., "Relying on the Information of Interested Parties," Rand Journal of Economics, Spring, vol. 17, No. 1, pp. 18-32 (1986).

Perry et al., "Trademark Licensing in Monopolistically Competitive Industry," Rand Journal of Economics, vol. 17, No. 2, Summer pp. 189-200 (1986).

Schleifer, "A Theory of Yardstick Competition," Rand Journal of Economics, vol. 16, No. 3, Autumn, pp. 319-327 (1985).

Shubik et al., Market Structure and Behavior, pp. 40-43, 46-49, 56-59, 80-89, 92-95, 142-149 and 196-199 (Harvard U. Press 1980).

Sklivas, "The Strategic Choice of Managerial Incentives," Rand Journal of Economics, Autumn, vol. 18, No. 3, pp. 452-458 (1987).

Tam, "A Mechanism to Induce Ramsey Pricing for Natural Monopoly Firms," International Journal of Industrial Organization, vol. 6 No. 2, pp. 247-262 (1988).

* cited by examiner

METHOD AND APPARATUS FOR PREVENTING OLIGOPOLY COLLUSION

This is also a continuation of application(s) Ser. No. 07/649,217 filed on Jan. 25, 1991, now abandoned.

This is also a continuation of application(s) Ser. No. 07/277,142 filed on Nov. 29, 1988, now abandoned.

This is a continuation of application(s) Ser. No. 07/794,791 filed on Nov. 19, 1991, now abandoned.

This application is a continuation of application Ser. No. 07/954,795, filed Sep. 30, 1992 now abandoned.

TECHNICAL FIELD

This invention relates to the economic field of industrial organization and more particularly to the reduction of incentives for industrial collusion.

BACKGROUND ART

I. Economic

Industry structures have traditionally been classified into four possible types: perfect competition, monopoly, oligopoly, and monopolistic competition. Perfect competition is a market structure in which many firms produce an identical product. No individual firm can unilaterally raise the price of its product above market price, nor do firms collude to raise prices. Monopoly is a market structure in which only one firm produces the industry's output. The monopolist may unilaterally raise his price above cost without fear that rivals may undercut his price. Perfect competition cannot be improved on, while natural monopolies are normally regulated.

Most real-world markets have elements of monopolistic competition and/or oligopoly. Oligopoly is an industry structure with only a few firms, so collusion is a serious possibility. Monopolistic competition is an industry structure where products are differentiated. This means that each firm's product is slightly different from every other firm's product, so that each firm is a kind of "mini-monopoly." Monopolistic competition may or may not have elements of collusion. Oligopoly may or may not have elements of product differentiation.

Collusion can be overt, covert, or tacit. Overt collusion occurs when there is open communication and coordination regarding prices and/or output. Covert collusion occurs when there is secret communication and coordination. Tacit collusion occurs when there is no actual communication, but each firm "understands" the mutual interest of all firms in keeping prices high, and acts accordingly. The prosecution of covert collusion requires direct or indirect evidence of a "conspiracy." The prosecution of tacit collusion requires the prevention of industry practices which tend to facilitate covert or tacit collusion. Needless to say, this allows many opportunities for collusion which are difficult to prosecute. Additionally, normal oligopoly interaction may result in above-competitive pricing even in the absence of any collusion or product differentiation.

Collusion may occur with varying degrees of success. Completely successful collusion means an industry sells at the monopoly price. Partially successful collusion results in an industry price intermediate between the competitive and monopoly levels. One reason collusion may fail is that firms frequently have an incentive to cheat on any collusive agreement or understanding.

Imperfect competition has two effects. One effect is to decrease the net benefit to consumers (also called consumers' surplus) of consuming a particular good, since the price is now higher. The other effect is to increase the profits to producers of the good. For example, there may be a loss of $150 in net benefits to consumers and a $100 gain in profits to producers. Since the $150 loss is partially offset by a $100 gain, only $50 in lost benefits are accounted by economists as a welfare cost to society as a whole. The remaining $100 loss is offset by a $100 gain, so this amount is accounted by economists as an income transfer from consumers to producers. Elimination of the welfare cost would be a definite benefit to society. Elimination of the income transfers is a benefit to society only to the extent that society views income transfers from consumers to producers as undesirable or undeserved.

Several studies have attempted to estimate the welfare cost of imperfect competition. Scherer's review of these studies concluded that the welfare cost for the U.S. "lies somewhere between 0.5 and 2 percent of gross national product, with estimates nearer the lower bound inspiring more confidence than those on the higher side." (F. M. Scherer, Industrial Market Structure and Economic Performance, 1980, p. 464.) Some estimates lie above or below Scherer's indicated range. Since G.N.P. is now about $4.5 trillion per year, 1% of G.N.P. is about $45 billion per year. These estimates of welfare cost do not take into account any possible increase in production costs due to lax management under imperfect competition, nor do they attempt to place any value on the possible undesirability of income transfers due to excess profits.

The term "firm", as understood herein, refers to any proprietorship, partnership, corporation, or other entity which operates within a given industry. Where a particular firm operates in more than one industry, "firm" shall refer only to that part or aspect of the firm's operations, including management compensation and profit calculation, which relates to the industry in question. "Industry" may be flexibly defined, both with respect to the types of goods and services provided and the geographic regions within which the goods or services are produced or sold.

II. Mathematical

A number of elements are used to measure firm performance and the competitive nature of an industry. Definitions of these elements are as follows:

P=Price of Output
Q=Quantity of Output
TC=Total Cost
TR=Total Revenue=P*Q
AC=Average Cost=TC/Q
AR=Average Revenue=TR/Q=P
MC=Marginal Cost=TC'(Q)=dTC/dQ
MR=Marginal Revenue=TR'(Q)=dTR/dQ
$\pi$=Profit=TR−TC The goal of a standard firm is to maximize its profit. A function reaches a maximum or minimum only when its derivative equals zero. When profit is maximized, the derivative of the profit function with respect to any variable under the firm's control is therefore zero. In particular: $\pi'(Q)=d\pi(Q)/dQ=0$.

Since $\pi(Q)=TR(Q)-TC(Q)$ (definition), therefore $\pi'(Q)=TR'(Q)-TC'(Q)$ (derivatives), therefore $0=MR(Q)-MC(Q)$ (substitutions). Hence, MR=MC or marginal revenue equals marginal cost for any firm which maximizes its profit.

A competitive firm may sell as much output as it likes at the market price. Hence, P(Q)=P, where P is the constant market price. For the competitive firm, TR(Q)=P*Q, so MR(Q)=TR'(Q)=P. Since MR=P for the competitive firm, the competitive firm chooses Q such that P=MR=MC. Hence, price equals marginal cost for all firms in a competitive industry.

A noncompetitive or imperfectly competitive firm may not sell as much output as it likes at the market price. Instead, the noncompetitive firm must lower its price if it wishes to sell more output. Hence, $P'(Q)<0$, meaning price falls when output rises. For the noncompetitive firm, $TR(Q) = P(Q)*Q$, so $MR(Q)=TR'(Q)=P(Q)+P'(Q)*Q$. Since $P'(Q)<0$ and $Q>0$, this implies $P(Q)>MR(Q)$. Since P>MR for the noncompetitive firm, the noncompetitive firm chooses Q such that P>MR=MC. Hence, price must exceed marginal cost for at least some firms in a noncompetitive industry.

III. Welfare Economics

Imperfect competition results in an inefficient allocation of society's resources. Resources are efficiently allocated when the total benefits of consumption minus the total costs of production are at a maximum. When efficiency occurs the marginal benefit to consumers of consuming an extra unit of a particular good is just equal to the marginal cost of producing an extra unit of that good. The marginal benefit to consumers is simply the price that consumers pay. Hence, efficiency occurs when price equals marginal cost for all goods.

Under perfect competition price equals marginal cost. Under monopoly, oligopoly, and monopolistic competition price exceeds marginal cost. When price exceeds marginal cost, the marginal benefit of extra consumption exceeds the marginal cost of extra production, so that economic welfare can be increased by producing (and consuming) more of that good. Assuming other objectives will not be adversely affected, the goal of any economic reform should be to set prices as closely as possible to marginal costs. Since there is no necessary relationship between average cost and marginal cost, marginal cost pricing may result in some firms earning an economic profit and other firms running an economic loss.

In perfectly competitive industries marginal cost pricing always occurs. Marginal cost may exceed average cost because an industry temporarily has a short supply of capital relative to demand. Because price exceeds average cost (P=MC>AC), the industry earns positive economic profit or an above-normal rate of return on capital. This attracts new capital into the industry until the industry earns zero economic profit or a normal rate of return on capital. Average cost may exceed marginal cost because an industry temporarily has an oversupply of capital relative to demand. Because price falls below average cost (P=MC<AC), the industry earns negative economic profit (economic loss) or a below-normal rate of return on capital. This induces capital to leave the industry until the industry again earns zero economic profit or a normal rate of return on capital. In the long run a competitive industry can be expected to earn zero economic profit or a normal rate of return on capital. An industry structure can remain competitive, however, only if there are no significant economies of scale.

Economies of scale occur when the average costs of production decline as more output is produced ($AC'(Q)<0$). For example, it is cheaper per car to produce a million cars than to produce only a thousand cars. It can be shown that when $AC'(Q)<0$ that $MC(Q)<AC(Q)$. If we set P=MC, then P<AC. Marginal cost pricing results in prices below the average cost of production. If economies of scale are a long-run phenomenon for the industry, marginal cost pricing must result in long-run economic loss. Private firms will not accept such losses unless they are being subsidized. Since the efficient allocation of resources requires marginal cost pricing, efficiency also requires subsidies to industries with long-run economies of scale.

IV. Description of the Prior Art

Prior systems for controlling economic collusion have not suggested that relative profit maximizing incentives be systematically used to reduce or eliminate collusion in an industry context.

Bishop (1960) in his article, "Duopoly: Collusion or Warfare?", suggests that oligopolistic firms might adopt a principle of maximizing relative rather than absolute profits when engaging in "warfare" rather than collusion. This "warfare" situation is alleged to be a naturally occurring state of affairs whenever there is a disagreement among oligopolists regarding how the jointly maximized profits under collusion should be divided up among the colluders. Bishop's principle of relative profit maximization is used only descriptively, not prescriptively. He suggests no practical application of this principle, nor does he describe any method or system for preventing oligopoly collusion. Bishop merely explains the principle of relative profit maximization and describes some of the first-order mathematical equations which derive from this principle. (See pages 940, 946, 950–961.)

Holmstrom (1982) explores the value of using relative performance evaluations (of workers, executives, etc.) to elicit optimal levels of effort from agents whose actual levels of effort cannot be directly observed. Holmstrom finds that relative performance evaluations will be useful only-if the different agents face some common uncertainties in their environment. (See pages 324, 325, 334–338, 339). By using the relative performance measures, one can at least partially separate out the influence of random environmental variables from the actual efforts of agents, and thereby reward the actual efforts of agents more precisely. In the absence of common uncertainties about which the relative performance evaluations are designed to elicit information, Holmstrom sees no use for relative performance evaluations. Holmstrom states: "Thus, inducing competition among agents by tying their rewards to each other's performance has no intrinsic value. Rather, competition is the consequence of the efficient use of information." Holmstrom, page 325. (See also pages 324, 335).

As an example of relative performance evaluation systems, Holmstrom mentions "the new executive incentive packages, which base rewards on explicit comparisons with firms within the same industry." (p. 325; see also pp. 335, 337). Holmstrom does not advocate a system for preventing oligopoly collusion by determining executive compensation on the basis of relative performance measures. Holmstrom sees the value of such compensation methods only as a way of evaluating more accurately the productive efforts of firm managers.

Holmstrom states, at page 337, "After stock options lost their tax advantage (and perhaps also because the market had been depressed in general), performance incentive packages [for executives] became popular." Holmstrom does not state whether these incentive packages specifically involve relative profit comparisons or whether they involve performance criteria other than relative profit comparisons, nor does he provide references.

In his concluding remarks, page 339, Holmstrom states:

There are other factors of the multiagent problem that have not been addressed in this article, but are worth studying. One concerns the possibility of collusion among agents when relative performance evaluations are used. Collusion may imply restrictions on reward structures. In this regard rank-order tournaments, which induce a zero-sum game between the agents, seem to have an advantage over schemes which are not zero-sum.

This brief comment fails to distinguish between cooperation among agents which furthers a principal's interests from cooperation which goes against a principal's interests, since absolute performance evaluations allow agents to cooperate in ways which further the interests of principals. This analysis is also incomplete because it fails to consider the disutility of effort, as opposed to the utility of income. A rank-order tournament is a zero-sum game only with respect to income, since agents might still wish to collude to reduce overall effort levels, while still maintaining overall income levels.

Fershtman and Judd (1987) discuss a basic theoretical framework which allows managers to have objectives other than simply maximizing profits, and assume that managerial objectives very closely follow the incentives provided to them by the methods of their compensation (p. 927). They analyze the possibilities for interaction among oligopolists, and ascertain what incentive structures for managers would be optimal for the profit-seeking owners of firms, rather than what incentive schemes would be best for society. Collusive behavior by owners or managers is not taken seriously, p. 939, and it is assumed behavior of both owners and managers is noncollusive. The analysis does not consider the possibility that a manager's compensation might be based, at least in part, on another firm's profits (pp. 930–31).

LIST OF PUBLICATIONS

Bishop, Robert L., "Duopoly: Collusion or Warfare?", American Economic Review (Menasha, Wis.: American Economic Association), December 1960, vol. 50, pp. 933–961.

Fershtman, Chaim and Judd, Kenneth L., "Equilibrium Incentives in Oligopoly," American Economic Review (Nashville, Tenn.: American Economic Association), December 1987, vol. 77, no. 5, pp. 927–940.

Holmstrom, Bengt, "Moral Hazard in Teams," Bell Journal of Economics (Lancaster, Pa.: American Telephone and Telegraph Co.), Autumn 1982, vol. 13, no. 2, pp. 324–340.

SUMMARY OF THE INVENTION

The present invention provides a new system for preventing oligopoly collusion by identifying and eliminating incentives for its occurrence. This is done by making managerial compensation depend on relative profits rather than absolute profits. It is assumed that the goals of the firm are determined by the incentives provided to managers. If managerial compensation depends only on the profits made by the manager's own firm, firm managers will attempt to maximize absolute profits. If managerial compensation depends on the profits made by the manager's own firm relative to the profits made by rival firms, then firm managers will attempt to maximize relative profits. If the goal of each firm is to maximize absolute profits, then a group of firms can collude to restrict output and raise prices so as to increase absolute profits for all firms in the group. However, if it is the goal of each firm to maximize relative profits, it is not possible for a group of firms to collude so as to increase the profits of all firms in the group relative to each other. Hence, an alteration of managerial incentives which changes the goal of firms to that of maximizing relative profits will eliminate incentives for industry-wide collusion.

In one embodiment of the invention, a method for reducing incentives for industry collusion and for reducing the degree to which prices exceed marginal costs includes the steps of measuring absolute performance measures for a primary firm and a set of comparison firms. The set of comparison firms may include one or more firms. The absolute performance measures may be measures of profits, sales revenues or costs of operation.

Next, a weighted performance comparison base is calculated based on the comparison firm absolute performance measures, e.g. by taking a weighted average. The weighted performance comparison base is compared to the primary firm absolute performance measure so as to obtain a relative performance measure. A managerial compensation amount is determined from the relative performance measure by a monotonic transformation. Finally, the manager is compensated according to the calculated managerial compensation amount.

The transformation relating the relative performance measure to the managerial compensation amount may be imposed or negotiated with the manager. Furthermore, the effort exerted by the manager in administering the firm may be measured and the managerial compensation amount may be made dependent on the resulting effort indicator.

In another embodiment of the invention applicable to industries featuring brand-name differentiation in the sale of a commodity, a level of quality may be assigned to a brand and all participating firms permitted to sell the commodity at that level of quality under the brand name. More specifically, bids from each of the participating firms as to the percentage of the total quantity of the commodity to be supplied at the assigned level of quality by the participating firms at a plurality of potential brand prices are measured. The bids by the firms at each selected potential brand price are summed to obtain a plurality of potential brand price supply percentage bid totals isomorphic to the plurality of potential brand prices. The potential brand price corresponding to the supply percentage bid total most nearly equal to unity is assigned to the brand name and the firms are induced to share the brand name by selling the commodity at the assigned brand price and level of quality according to the percentages that they bid.

Under this plan, the goodwill of the brand name may be enforced by fining firms which sell a commodity under the brand name at a level of quality falling below that assigned. In order to serve as a true incentive to maintain the level of quality, the amount of the fine should be greater than the firm's cost savings by selling below quality. The fine is then passed on to the managers either directly or through an adjustment in the absolute performance measure from which the manager's compensation is calculated.

In yet another embodiment of the invention, incentives for industry collusion are reduced by measuring the economic profit of each firm, summing the economic profits to obtain a total industry profit indicator, computing a total industry transfer payment, allocating the total industry transfer payment among the firms in a manner which maintains continued incentives for firm performance, and then either taxing or subsidizing each firm in the industry by an amount equal to the allocated transfer payment figure depending on whether the figure is positive or negative.

The present invention causes managers of firms to participate in a zero-sum game, or its equivalent or near-equivalent, and thus hinders or prevents cooperation or collusion among the managers of different firms. This is accomplished by the participation of firms as a whole in a zero-sum game and/or by arranging zero-sum compensation arrangements for the managers of different firms. The present invention is best implemented by a zero-sum game in profits, particularly long-term profits. An important result is the reduction or elimination of industry collusion in pricing and outputs.

Another result is the reduction of incentives for coordinated special interest industry lobbying. Even in industries where collusion is extremely unlikely, coordinated lobbying occurs. Absolute profit maximizing industries seek legislation and governmental regulations which increase joint profits and oppose legislation and regulations which reduce joint profits. Absolute profit maximizing industries easily and legally coordinate their lobbying activities to advance their own special interests, regardless of the effect this may have on the general public interest. Relative profit maximizing industries, on the other hand, have less incentive to coordinate their lobbying activities, because a gain in relative profits for one firm necessarily implies a loss in relative profits for another firm. Hence, the quantity and effectiveness of special interest industry lobbying would be much reduced.

An additional advantage of the relative profit maximizing scheme is its compatibility with other types of managerial incentives. For instance, managers can be compensated for effort (e.g., absolute hours of work) as well as for results (relative profits). More importantly, profit incentives for a firm operating in two or more industries or performing two or more activities are easily made compatible by compensating managers according to total profits of the firm, regardless of the type of profit (either absolute or relative) and regardless of the industry or activity in which said profit was obtained. Such compensation gives managers no direct incentive to switch the accounting of costs from one activity to another. Indirect, strategic use of accounting to influence the behavior of comparison relative profit maximizing firms may be avoided by requiring the use of specific accounting rules for the allocation of costs among the various activities of the firm.

The compatibility of relative profit maximizing incentives and absolute profit maximizing incentives provides the advantage of enabling a firm to be an absolute profit maximizing monopolist with respect to the licensing of patented activities and a relative profit maximizing competitor with respect to unpatented activities.

While instituting a zero-sum game in terms of managerial income does not eliminate possible incentives for managers to collude to reduce joint levels of effort, collusion among managers to reduce effort levels is not a serious threat in any event. Managers of different firms typically work in separate locations, and agreements among managers to reduce effort levels are difficult for the managers to monitor and enforce.

With relative profit maximizing incentives, risk-averse managers have a greater incentive to copy each others' business strategies so as to reduce the level of risk which they expose themselves to. This does not mean that relative profit maximizers will be any more likely to avoid risk, per se, since a relative profit maximizing industry could take on a very great amount of risk, where the risks are highly correlated among firms so that relative profits will be little affected whatever the outcome. If, however, it appears desirable to do so, greater risk-seeking incentives may be introduced into the manager's compensation equation to offset their natural risk aversion, by increasing the rewards for success and reducing the penalties for failure.

By rewarding managers on the basis of relative profits, the present invention does provide managers with a direct incentive to reduce comparison firm profits by, for example, sabotaging their rival firms' operations. Such action seems unlikely, however, since legal penalties sufficiently deter this type of criminal activity. Rival firms are also able to prevent such actions by investigating, reporting and prosecuting sabotage activities which reduce profit levels. If desired, however, incentives for causing sabotage may be eliminated by exactly offsetting (or further penalizing) any gain in managerial compensation which would otherwise result from sabotage occurring in rival firms, even if legal culpability cannot be established.

Additional features of the present invention will become apparent and a fuller understanding obtained by reading the following detailed description in connection with the accompanying drawings.

DESCRIPTION OF THE PREFERRED EMBODIMENT

The description of the preferred embodiment is divided into four sections. Section A discusses the computation of managerial incentives and refers extensively to the drawings. Section B discusses the collection and organization of firm performance data upon which managerial compensation is to be based. Section C discusses the manner in which industry subsidies may be calculated and paid. Finally, Section D provides an example of how the invention may be applied to certain monopolistically competitive industries.

A. Calculation of Incentives

A good way to motivate managers to pursue a particular goal is to pay managers in accordance with success in achieving that goal. If the goal is to maximize absolute profits, managers should expect to receive more compensation if the firm earns higher profits. This may be an informal expectation regarding bonuses and pay raises, or a more formal expectation based on stock ownership or rules for calculating compensation based on profits. If we wish to avoid guesswork regarding the true goals of management, we should formalize the rules for determining managerial compensation. By altering the rules for managerial compensation in the appropriate way, we can make sure that managers are motivated to maximize relative profits rather than absolute profits.

Figure 1:
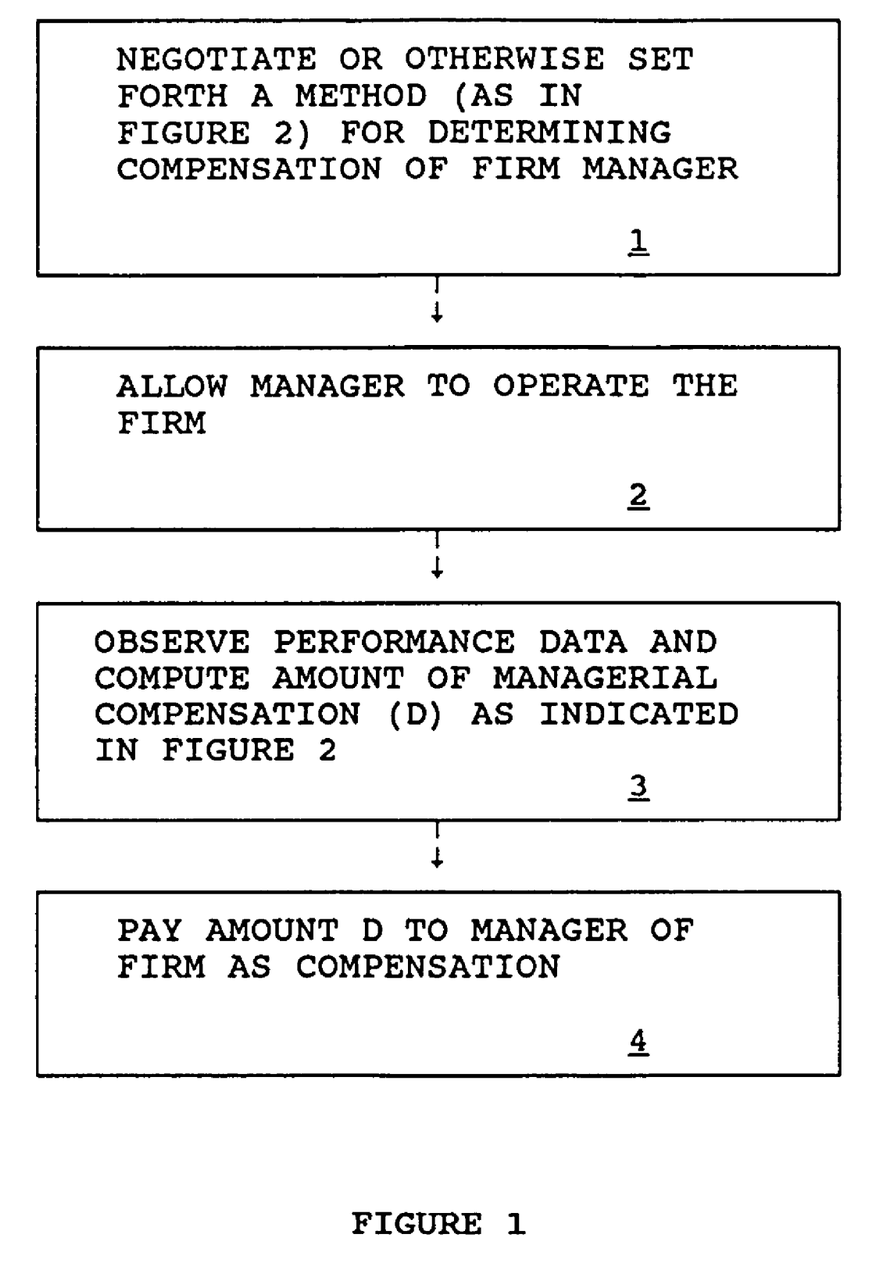
FIG. 1 is a schematic diagram illustrating the method of the present invention, showing the logical steps necessary for a scheme of motivating managers through pecuniary incentives.
Figure 2:
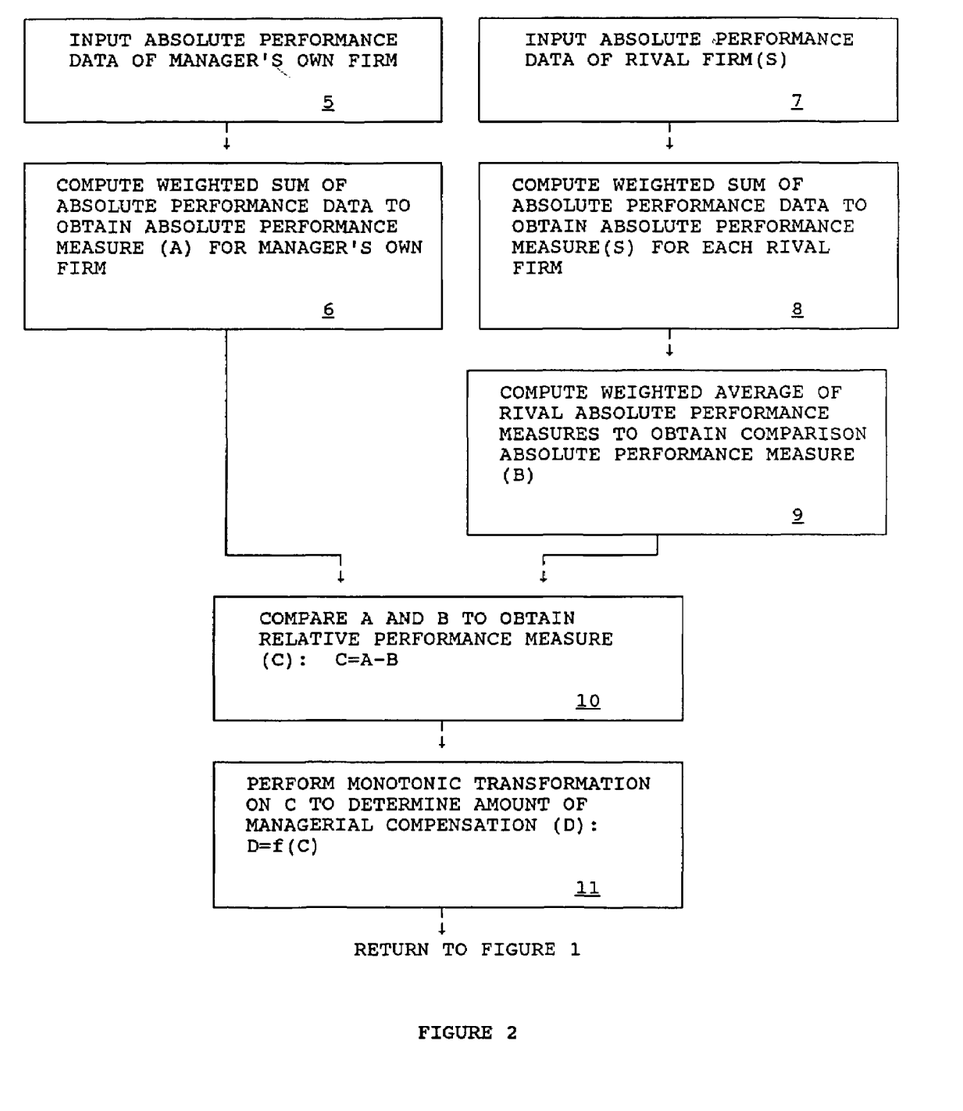
FIG. 2 is a schematic diagram corresponding to Box 3 of FIG. 1 and showing the computational aspect of the invention in determining the amount of a manager's compensation.

FIGS. 1 and 2 show the logical steps involved in properly motivating a manager to maximize relative profits. The flow charts describe a method by which a single manager at a single firm is motivated to maximize his relative performance. The present invention works best as a system or combination in which managers at two or more firms in an industry are each motivated to maximize the relative profits of their respective firms. This system or combination is easily effected by separately motivating the managers at different firms.

The term "manager", as used herein, refers to any manager, director, officer, stockholder, business owner, or other person having direct or indirect administrative control, either partial or complete, over a firm's operations. It is not essential for the success of the invention that every person in the named categories be motivated to maximize relative profits, as long as person(s) with dominant authority in the firm are so motivated. There may be only one, or more than one, person in each firm who is so motivated.

In a preferred embodiment of the invention illustrated in FIG. 1 of the drawings, Step 1 is the reasonable step of informing the manager of the method or criteria by which he is to be compensated. The amounts to be paid the manager under each contingency might be set forth, on a take it or leave it basis, by the party (public or private) responsible for determining managerial compensation. Alternatively, the amounts might be negotiated with an individual manager or set out to bid with several managers. Typically, a potential manager will wish to negotiate only the amounts or level of compensation, rather than the general nature of the contingency basis by which he is given incentive to pursue a particular goal, such as whether he should maximize absolute profits or relative profits. Arguably, Step 1 is somewhat dispensable, since one might rely on informal expectation rather than formal agreement concerning future compensation, though this would not be good practice.

Step 2 is the necessary step of allowing the manager to have some sort of authority, control, or influence over the firm's operations. This authority need not be complete, as when individuals must work through a committee, or when one person works underneath another.

Step 3 is essential to any contingent payment scheme intended to reward managerial performance. Managerial performance must be observed and evaluated and appropriate compensation determined therefrom. Step 3 in FIG. 1 indicates that the subroutine in FIG. 2 is to be performed. The details of this process for the present invention are discussed below in connection with FIG. 2.

Step 4 is the final step in the process, without which the manager would fail to be properly motivated. The manager must be paid. At the very least, the manager must have a reasonable basis for supposing that such compensation will be forthcoming. Compensation refers to the provision of money or its equivalents, financial or real assets, and/or goods or services capable of provision within the natural, physical, or real world. Fines, penalties, and punishments are a form of negative compensation.

Steps 1–4 are steps in a process of motivating management which may be performed simultaneously more than once with respect to the same manager in the same firm. Thus, for example, negotiations in Step 1 can be concluded on the same day for many different pay periods in Step 4. Likewise, payments in Step 4 may be made on the same day for Step 1 negotiations made at different times.

Referring now to FIG. 2 of the drawings, we see the computational subroutine indicated by Box 3 in FIG. 1. Steps 5 and 7 refer to the inputting of absolute performance data from each of two or more firms in an industry. Steps 6 and 8 refer to the computing of an absolute performance measure for each of the same two or more firms in an industry. For convenience of exposition, these logically correlated steps are separated into Steps 5 and 6 for data and computations related to the manager's own firm and Steps 7 and 8 for data and computations related to rival firm(s) in the industry.

Steps 5 and 7 refer to the inputting of absolute performance data of own and rival firms. The absolute performance data of interest for the present invention are such data as revenues, costs, assets, liabilities, stock values, and other data which allow for a direct or indirect calculation or inference of profit or changes in profit potential. Such data may be "objective" data collected by accountants or "subjective" evaluations by outsiders with no incentive to falsify their estimates (e.g., the implicit evaluation of a firm's profit potential by traders in a firm's stock).

Steps 6 and 8 take the absolute performance data for each firm and compute an absolute performance measure for each firm. The preferred performance measures for the present invention are those which reflect profit and/or change in expected profit. A positive weight must be placed on those data indicators (e.g., revenues) which impact positively on profits or expected profits. Conversely, a negative weight must be placed on those data indicators (e.g., costs) which impact negatively on profits or expected profits. Section B discusses further the organization of data to obtain measures of profit or change in expected profit. Since there are several methods for measuring profit, one or more of such methods must be chosen and weighted and summed up to obtain a single number which may be called an "absolute performance measure" for each firm. It is preferred that the same method for computing the absolute performance measure be used for each firm being compared within an industry.

Step 9 takes the absolute performance measures computed in Step 8 for the rival firms and computes a weighted average to obtain a comparison absolute performance measure (B). The weighted average is simply a weighted sum in which the coefficients or weights on the components being added must sum to one. If the game is completely symmetrical, these weight coefficients will equal the reciprocal of the number of rival firms. The game need not be symmetrical, however, and other weight coefficients may be chosen. If there is only one rival firm, then Step 9 reduces to the trivial step of setting the comparison absolute performance measure equal to the absolute performance measure computed in Step 8.

Step 10 requires a comparison between the absolute performance measure (A) computed in Step 6 for the manager's own firm and the comparison absolute performance measure (B) computed in Step 9 from the performance of the rival firm(s). The result of the comparison is computation of a relative performance measure (C) for the manager's own firm. The preferred method of computation is a simple subtraction: $C=A-B$.

Step 11 performs a monotonic transformation on the relative performance measure (C) to determine the amount (D) which should be paid the manager as compensation. A monotonic transformation is any function f such that if $x>y$ then $f(x)>f(y)$. Thus, $D=f(C)$. An example of such a function is $D=a+bC$, where a and b are constants and $b>0$. Care should be taken to avoid functions which do not allow sufficient variation in compensation outcomes to provide adequate incentive for managers to perform well.

After Step 11 in FIG. 2 is completed, the subroutine exits to Step 4 of FIG. 1 in order to pay the manager his compensation.

This method of determining managerial compensation may be illustrated in more detail by considering the economic theory from which it is derived.

Let G be a statistic which describes something about a firm. If the firm's managers are rewarded for achieving higher levels of G, then maximizing G will be the firm's goal. If G represents simply the firm's profits, then the firm's goal is to maximize absolute profits. If G represents the firm's profits relative to other firms' profits, then the firm's goal is to maximize relative profits.

Suppose there are three firms in an industry. Let G1, G2, G3 be the goal statistics for these firms. Let $\pi 1$, $\pi 2$, $\pi 3$ be the profits earned by these firms. Let the goals be functions solely of the profits:

$G1(\pi 1,\pi 2,\pi 3)$, $G2(\pi 1,\pi 2,\pi 3)$, $G3(\pi 1,\pi 2,\pi 3)$.

Since we desire to eliminate all incentives for collusion, we must set up a zero-sum game. In the zero-sum game it is possible for one firm's manager to gain only if another firm's manager loses, since there is only a fixed quantity of rewards to go around. In a nonzero-sum game it is frequently possible for everyone to gain through cooperation (collusion) as opposed to noncooperation, since cooperation may increase the total quantity of rewards available to go around.

When goals are based on profits, the conditions for a zero-sum game are:

$G1(\pi 1,\pi 2,\pi 3)+G2(\pi 1,\pi 2,\pi 3)+G3(\pi 1,\pi 2,\pi 3)=K$, for all $\pi 1$, $\pi 2$, $\pi 3$ and some constant K.

Although nonlinear goal functions are certainly possible, for specificity we may wish to consider only goal functions which are linear in profits. This converts the general goal functions to become:

$G1=w11*\pi 1+w12*\pi 2+w13*\pi 3+K1$, $G2=w21*\pi 1+w22*\pi 2+w23*\pi 3+K2$, $G3=w31*\pi 1+w32*\pi 2+w33*\pi 3+K3$, where all w's and K's are fixed constants.
The zero-sum conditions require:

$w11+w21+w31=0$, $w12+w22+w32=0$, $w13+w23+w33=0$, $K1+K2+K3=K$.

Suppose that we have an industry where each firm sells an identical product of identical quality and consumers always buy the lowest-priced product. Then the price of the product must be the same for all firms and depends solely on the total quantity sold in the industry: $P=p(Q1+Q2+Q3)$. Total revenues for each firm are simply price times quantity sold by each firm: $TR1=P*Q1$, $TR2=P*Q2$, $TR3=P*Q3$. Total costs for each firm are determined by the quantity produced by each firm and its cost function. In this example we assume that cost functions are identical for each firm: $TC1=C(Q1)$, $TC2=C(Q2)$, $TC3=C(Q3)$. Since profits are the difference between total revenues and total costs, we have:

$\pi 1=TR1-TC1=P*Q1-C(Q1)$, $\pi 2=TR2-TC2=P*Q2-C(Q2)$, $\pi 3=TR3-TC3=P*Q3-C(Q3)$.

Substituting these expressions for profit into the original goal functions we obtain:

$$G1 = w11*(P*Q1 - C(Q1)) + w12*(P*Q2 - C(Q2)) + w13*(P*Q3 - C(Q3)) + K1,$$
$$G2 = w21*(P*Q1 - C(Q1)) + w22*(P*Q2 - C(Q2)) + w23*(P*Q3 - C(Q3)) + K2,$$
$$G3 = w31*(P*Q1 - C(Q1)) + w32*(P*Q2 - C(Q2)) + w33*(P*Q3 - C(Q3)) + K3.$$

We assume that each firm has control only over its own output, and not the output levels of other firms. Each firm must choose its output level so as to maximize the value of its goal function. Firm 1 must choose Q1 to maximize G1, firm 2 must choose Q2 to maximize G2, and firm 3 must choose Q3 to maximize G3. We determine what level of Q for each firm maximizes G for each firm by taking derivatives and setting the derivatives equal to zero. For simplicity, we assume Cournot conjectures (no change in rival firms' output expected to occur in response to a firm's change in its own output level) below. Thus:

$$(dG1/dQ1) = w11*[P - C'(Q1)] + p'(Q)*[w11*Q1 + w12*Q2 + w13*Q3] = 0,$$
$$(dG2/dQ2) = w21*[P - C'(Q2)] + p'(Q)*[w21*Q1 + w22*Q2 + w23*Q3] = 0,$$
$$(dG3/dQ3) = w31*[P - C'(Q3)] + p'(Q)*[w31*Q1 + w32*Q2 + w33*Q3] = 0,$$
where $Q = Q1 + Q2 + Q3$.

Assuming that society decrees that at least three firms should operate in this industry, that cost functions are identical, and that marginal cost is convex, then the optimal industry outcome occurs when Q1=Q2=Q3 and P=C'(Q1)=C'(Q2)=C'(Q3). (Price equals marginal cost for each firm). These conditions are met only when the weights on profits meet the following conditions:

$w11+w12+w13=0$, $w21+w22+w23=0$, $w31+w32+w33=0$.

These three conditions for optimality are in addition to the three conditions on weights needed to insure the zero-sum nature of the game. Of these six conditions, one is redundant. Without affecting the outcome of the game, we can normalize w11=1 by dividing all weights by w11. Hence, we have eight weight coefficients which may take on any set of values subject to five restrictions. This means that only three of the weights can take on values independently. Additionally, if we assume there are no side payments between the managers of different firms, we can multiply or divide the goal functions for each firm by arbitrary constants without affecting the outcome of the game. Hence, let us normalize w22=1 by dividing w21, w22, w23 by w22 and normalize w33=1 by dividing w31, w32, w33 by w33. We can also normalize K1=K2=K3=0 without affecting the game's outcome. Letting a, b, c be independently chosen weights, optimal linear goal functions for three firms take the form:

$G1=\pi 1-a*\pi 2-(1-a)*\pi 3$, $G2=\pi 2-b*\pi 3-(1-b)*\pi 1$, $G3=\pi 3-c*\pi 1-(1-c)*\pi 2$.

The optimal linear goal functions for two firms take the form:

$G1=\pi 1-\pi 2$, $G2=\pi 2-\pi 1$.

The optimal linear goal functions for four firms have the form:

$G1=\pi 1-a*\pi 2-e*\pi 3-(1-a-e)*\pi 4$, $G2=\pi 2-b*\pi 3-f*\pi 4-(1-b-f)*\pi 1$, $$G3=\pi 3-c*\pi 4-g*\pi 1-(1-c-g)*\pi 2,$$

$$G4=\pi 4-d*\pi 1-h*\pi 2-(1-d-h)*\pi 3.$$

In each of these instances, the goal function for each firm was in the form of a comparison between a measure of the performance of the firm, i.e. absolute profit, and an absolute performance comparison base, i.e. a weighted average of the absolute profits of the competing firms.

A completely symmetrical set of goal functions for three firms would set $a=b=c=1/2$ and for four firms would set $a=b=c=d=e=f=g=h=1/3$. A set of goal functions which is only rotationally symmetric would set $a=b=c$ for three firms and set $a=b=c=d$ and $e=f=g=h$ for four firms. However, any arbitrary set of values for these variables is apparently permissible, regardless of whether the resulting goal functions are symmetric or not.

The remaining theoretical results regarding relative profit maximizing industries are set forth without proof. In the long run we expect cost functions to be identical for all firms. As noted, price equals marginal cost for all firms when cost functions are identical for all firms. This is a perfect outcome, so it cannot be improved on. This outcome occurs regardless of the conjectures a firm may have regarding how other firms will respond to a change in its own output level. The example above assumed Cournot conjectures, but the result generalizes to any set of arbitrary conjectures.

In the short run we expect that different firms may have different cost functions. When conjectures are symmetric and the game is symmetrical, price will be set equal to the average of the marginal costs of each firm, while the marginal costs may differ. This is not a perfect outcome, so it could be improved on in principle. In a 2-firm game the outcome which results is independent of the nature of the conjectures. In a 3-or-more firm game the outcome which results does depend on the nature of the conjectures. We would normally expect the outcome from a relative profit maximizing industry to be superior to the outcome from an absolute profit maximizing industry. Some extreme examples can be constructed in which the opposite is true.

In a 2-firm game there is obviously no incentive for collusion. In a 3-firm game no incentive exists for all three firms to collude, but there may be incentives for two firms to collude against the third. Incentives for pairwise collusion exist only when the cost functions of different firms are not identical. I suspect that the incentives for pairwise collusion by relative profit maximizers are much weaker than the incentives for general collusion by absolute profit maximizers, though I have not proved this. Nevertheless, if pairwise collusion does occur, the outcome is worse than if no collusion occurred. Hence, the antitrust laws should continue to be enforced against pairwise collusion.

Completely symmetric goal functions are probably most conducive to tacit pairwise collusion, since any agreement need only specify that output levels be increased or reduced proportionately. Somewhat asymmetric goal functions, including rotationally symmetric goal functions, may help prevent such tacit collusion by making mutually beneficial collusion less simple to enact. However, the outcome which results from asymmetric goal functions may be less satisfactory than the outcome from symmetric goal functions if no pairwise collusion takes place. Hence, the use of asymmetric goal functions may not be indicated if pairwise collusion turns out not to be a serious threat.

If products are differentiated rather than undifferentiated as in the above example, or if consumers are not avid comparison shoppers, then prices will be set above marginal costs, but still be less than the prices which would occur if firms were absolute profit maximizers. This represents a limited improvement, but is not a general cure for problems of monopolistic competition. In a later section, I explain an application of relative profit maximization which results in still further improvement of those types of monopolistic competition situations which are caused by brand-name differentiation.

B. Organization of Performance Data

This section discusses in more detail possible methods for organizing the performance data in Steps 5 and 7 to obtain performance measures in Steps 6 and 8. Performance data for each firm will normally be gathered on a regular basis (e.g., monthly, quarterly, annually), both during and after a manager's tenure. Such data may be inputted as convenient. Since the concept of profit and its calculation are well known to the arts of economics and accounting, I discuss only the more unusual aspects of organizing the data for subsequent processing.

Three methods can be used for calculating or estimating profit: accounting methods, market evaluation methods, and nonmarket evaluation methods. Evaluation methods estimate both current and expected future profits. Accounting methods are limited to determining current or past profits. Since normal (or market) rates of return on capital are counted by economists as a cost, the use of accounting methods to make profit comparisons requires adjustment to reflect the implicit costs of capital provided by equity investors.

Market evaluation methods focus on changes in market valuation of firm equities. For example, a manager working today might be paid a fixed salary plus a bonus to be paid five years from now based on relative profitability calculated five years from now. The absolute performance measure for each firm is computed on the basis of the total value of common stock (value of each stock share times total number of shares) as determined five years hence. Using this method, adjustments are made for dividend payments and issuance of new stock during the five-year period, with compounding at an appropriate interest rate until five years hence. Dividends paid out by each firm during the five year period are given positive weight, while the value of new stock issues by each firm during the five-year period are given negative weight in the computation of the absolute performance measures. This latter requirement is necessary because the issuance of new stock imposes an implicit cost of capital on equity investors.

This method of motivating the maximization of relative profits works because changes in a firm's actual or prospective profit induce corresponding changes in the market value of a firm's liabilities and ownership equity. In an alternative implementation of market evaluation methods, the total values of all debt and equity may be substituted for the common stock values alone in the profit changes calculations. Payments of principal and interest are adjusted in the same manner as dividend payments, and new debt issues and new borrowing are treated like new stock issues. One advantage of this combined debt/equity substitution is a lessened inclination of management to risk default on loans or bonds in order to increase the expected profitability of the common stock. Alternate subsets of debt and equity can be used to motivate relative profit maximization, as long as the common stock is included. A further alternative is to require managers to accept unlimited liability for a fraction of unpaid liabilities in the event of bankruptcy, where the fraction is the same as the fraction of profits the managers earn.

Market evaluation is feasible mainly for large corporations whose common stock is regularly traded by large numbers of traders. In firms dominated by one owner, firms without issued stock or stock not sufficiently traded, government owned firms, or conglomerate firms operating in several industries, a nonmarket evaluation is preferable. Nonmarket methods estimate past, present, or future numerical values or quantities by evaluators. An example of a nonmarket system is a committee which estimates the future profitability of a firm by majority vote. Another example is a committee which estimates by majority vote the "fair market value" of a firm's assets, liabilities, or equities. More complicated evaluation systems (if novel) may be a fit subject for a separate patent.

C. Payment of Subsidies

Since relative profit maximizers may set prices very close to marginal costs, subsidy determinations may be needed to offset economic losses in some industries. When oligopolistic industry exhibits economies of scale, average cost per unit declines as output increases, and marginal cost is less than average cost. If price equals marginal cost, then the price is less than average cost, and the firm is running an economic loss (negative economic profit). Losses must be subsidized if the firms are to remain in business.

The amount of subsidies to the industry as a whole should be enough to cause the industry to earn zero economic profit. For symmetry, if the industry is earning positive economic profit, industry economic profits may be 100% taxed so that the industry retains only zero economic profit. The government calculates the proper tax or subsidy using accounting methods altered to reflect the implicit cost of equity investor capital. Total costs, including a normal rate of return on capital, are subtracted from total sales revenues to determine the industry's economic profit or loss and hence the appropriate industry tax or subsidy. (If there is objection to paying a net industry subsidy from general revenues, the needed subsidy may be obtained by special tax on the industry's outputs, sales, costs, or inputs. This would, however, push prices above marginal costs.)

This industry tax/subsidy is apportioned among the covered firms in the industry in such manner as will not affect the relative profit maximizing incentives of covered firms in the industry. When directly estimating or calculating profits using accounting and/or nonmarket evaluation methods, any method of apportionment accomplishes this, providing the tax/subsidy is not counted as part of revenues or costs of any firm when calculating the profits of each firm for purposes of managerial compensation. One possible method of apportioning the tax/subsidy would be to offset the economic profit or loss of each firm so that each firm receives precisely zero economic profit.

When profits are indirectly calculated from changes in valuation of firm equities or firm liabilities using market and/or nonmarket evaluation methods, the workable methods of apportioning the industry tax/subsidy among the firms is restricted because any tax paid or subsidy received by a firm automatically becomes incorporated into the valuation of a firm's equities and liabilities. A workable method within this restricted category includes equal division of the tax/subsidy among all covered firms in the industry (assuming optimal weighing of the goal function as previously described in Section A). If managers are motivated to maximize relative profits, possible mistakes in calculating the industry tax/subsidy will not affect the economic outcome, nor will capital be used inefficiently, since the size of the tax/subsidy will not affect relative profits when it is equally divided among the firms.

An alternative way of implementing the present invention is to impose the zero-sum game, not upon the managers of firms, but upon the owners of firms. This may be implemented by an industry-wide tax/subsidy scheme which yields an expectation of zero economic profits for the industry as a whole. Economic incentives are maintained by allocating the tax/subsidy transfer payment among the firms such that each firm is effectively motivated to maximize relative profits. A drawback to this alternative method of implementation is that if managers are motivated to maximize absolute profits, systematic mistakes by government in calculating the tax/subsidy transfer payments may result in inefficient under- or over-investment in physical capital. Let r be the market rate of return on capital and let s be the imputed rate of return on capital permitted the industry when calculating the tax/subsidy. If $r=s$, capital is used efficiently. If $s<r$, firms use too little capital. If $s>r$, firms use too much capital. The degree of inefficiency depends on the number of firms, the extent of collusion, and the difference between r and s. If r and s are nearly equal, collusion to alter the size of the tax/subsidy is less likely, and the degree of inefficiency resulting from noncollusive conduct is smaller. If collusion occurs, the degree of inefficiency could be extreme even if the difference between r and s is small. Hence, it is preferable that managers be motivated to maximize relative profits rather than absolute profits.

D. Example: Brand-Name Industries

In industries where brand name products are produced by different firms and shipped to retailers, each firm has some ability to raise the price of its product without losing all its customers. This is true even if each firm's product is of identical quality with its brand name competitors. Customers frequently have brand loyalty (mistakenly or otherwise) and often do not bother to compare prices. (See Pratt, Wise, and Zeckhauser 1979). Hence, this type of (monopolistically competitive) market allows firms to charge prices somewhat higher than marginal cost. The installation of relative profit maximizing firms will only somewhat ameliorate this situation, unless further measures are taken.

Further measures would allow different relative profit maximizing firms to produce the same brand name product and to require each firm to charge the same price for the product. The price would be determined by having the relative profit maximizing firms bid on the percentage of total market sales they are willing to produce at each possible price. If the total of percentage sales bid by each firm for a particular price exceeds 100%, then the price is made lower. If the total of percentages bid falls short of 100% for a particular price, then the price is made higher. If the total of percentages bid by each firm equals 100% for a particular price, then the price is just right.

Firms are then required to produce the percentages of total sales of that product they have agreed by their bids to produce. The brand name products produced would then be sold to retailers/customers without regard to which firm produced the product. Since these are relative profit maximizing firms and the identical goods being sold must be sold at identical prices, the price under this procedure will be set equal to the average of the marginal costs at each firm. In effect, prices are being auctioned to clear the market (desired quantities supplied being made equal to total quantity demanded). Prices may be auctioned anew at whatever frequency of price adjustment is considered desirable.

A predictable consequence of this approach is that firms may attempt to lower product quality. If lower quality can be produced at cheaper cost and still be sold at the same price, then it will be profitable to lower product quality. Under current arrangements, only one firm is permitted to produce a particular brand name product. This allows a firm to develop and maintain a "reputation" of a particular quality for a particular brand name product. Lowering the quality of its product will result, ultimately, in a reputation for providing lower quality and in customers being willing to buy that product only at lower prices. Thus, a firm cannot over the long run expect to sell a lower quality product at the same price as a higher quality product. However, a firm has incentive to maintain a high quality reputation only if it is receiving positive profits and/or has invested sunk costs which it fears to lose if it lowers product quality. Hence, the incentives needed to maintain product quality may result in pricing above marginal cost, even if markets are otherwise competitive. This means that current arrangements for maintaining product quality are not fully efficient. (See Shapiro 1982 & 1983).

However, if more than one firm is permitted to produce the same brand name product, there will be little or no incentive to maintain the quality reputation of the product. Maintenance of quality must therefore be supplied by regulation. Each brand name must be assigned a particular level of minimum quality. If a particular firm produces the brand name product at less than its minimum assigned quality, a fine must be imposed on the firm and/or its manager(s). In order to deter quality deterioration, this (actual or imputed) fine on the firm must be (significantly) greater than the reduction in costs associated with the observed level of quality deterioration. The manager of the firm would then be rewarded salary in accordance with relative profit maximizing principles either based on the actual profit of the firm after an actual fine has been deducted or based on the actual profit of the firm minus the imputed fine. There is no need to reward managers for higher than minimum quality, since higher quality standards can always be assigned to different brand names.

Relative profit maximizing firms are likely to be easier to regulate for quality standards than absolute profit maximizing firms since relative profit maximizing firms have a strong interest in seeing that rival firms do not increase their profits unjustly. Hence, relative profit maximizing firms will be very cooperative with regulators in ensuring that rival firms meet agreed-upon quality standards. Also, a relative profit maximizing industry will be cooperative with regulators in setting sensible quality standards, since relative profits on average will be the same, regardless of whether quality standards are high or low. By contrast, an absolute profit maximizing industry would resist quality regulations which reduce industry profits.

This method of bidding on percentage quantities of total sales cannot be applied if customers are free to choose which firms to purchase from. This bidding method is therefore not apt for monopolistically competitive retail establishments doing business in separate locations. This bidding method can be appropriate to firms manufacturing in the same or different locations, provided that the quantities ordered and shipped from each firm are being coordinated to fulfill the terms of each firm's bids.

REFERENCES FOR BRAND-NAME SECTION

Pratt, J., Wise, D., and Zeckhauser, R., "Price Differences in Almost Competitive Markets," Quarterly Journal of Economics, May 1979, vol. 93, pp. 189–211.

Shapiro, C., "Consumer Information, Product Quality, and Seller Reputation," Bell Journal of Economics, Spring 1982.

Shapiro, C., "Premiums for High Quality Products as Returns to Reputation," Quarterly Journal of Economics, November 1983, vol. 98, pp. 659–680.

Although the invention has been described with a certain degree of particularity, it should be understood that various changes can be made to it by those skilled in the art without departing from the spirit or scope of the invention as hereinafter claimed.

The invention claimed is:

1. A method of compensating a manager who exercises administrative control over operations of a privately owned primary firm for the purpose of reducing the degree to which prices exceed marginal costs in an industry, reducing incentives for industry collusion between the primary firm and a set of comparison firms in said industry, or reducing incentives for coordinated special interest industry lobbying, said set of comparison firms including at least one firm, said primary firm having the manager who exercises administrative control over said primary firm's operations during a sampling period, wherein privately owned means not wholly government owned, the method comprising the steps of:
 a) choosing an absolute performance standard from a set of absolute performance standards;
 b) measuring an absolute performance of said primary firm with respect to said chosen absolute performance standard for said sampling period;
 c) measuring an absolute performance of each firm of said set of comparison firms with respect to said chosen absolute performance standard for said sampling period, said measurement of performance for each firm of said set of comparison firms forming a set of comparison firm absolute performance measures;
 d) determining a performance comparison base based on said set of comparison firm absolute performance measures by calculating a weighted average of said set of comparison firm absolute performance measures;
 e) comparing said measurement of absolute performance of said primary firm with said performance comparison base;
 f) determining a relative performance measure for said primary firm based on said comparison of said primary firm measurement of absolute performance and said performance comparison base;
 g) determining the managerial compensation amount derived from said relative performance measure according to a monotonic managerial compensation amount transformation; and
 h) transferring compensation to said manager, said transferred compensation having a value related to said managerial compensation amount.

2. A method according to claim 1 wherein the performance standards in the set of performance standards include profitability, sales revenue an operating cost.

3. A method according to claim 1 wherein said relative performance measure is a difference between said measure of performance of said primary firm and said performance comparison base.

4. A method according to claim 1 including the additional step of measuring an effort indicator related to an effort exerted by said manager in exercising administrative control over said primary firm during said sampling period and wherein the value of said transferred compensation is additionally related to the magnitude of said effort indicator.

5. A method according to claim 1 wherein a brand-name commodity is to be supplied by the primary firm and the set of comparison firms, said method including the additional steps of:

h) assigning a level of quality to said brand-name commodity;
   i) instituting an auctioning scheme to determine a market price of said brand-name commodity and inducing the primary firm and the set of comparison firms to supply said brand-name commodity at said market price;
   j) monitoring the level of quality of said brand-name commodity; and
   k) inducing said primary firm to supply said brand-name commodity at said level of quality by fining such manager if the quality of said commodity supplied by said primary firm falls below a level of quality assigned to the commodity, the amount of the fine being greater than an increase in managerial compensation which would otherwise result from a reduction in cost of supply of the commodity by said firm resulting from the reduction of quality below the level of quality assigned to the commodity.

6. A method according to claim 1 wherein said primary firm and said set of comparison firms form a joint set of firms, at least one firm in said set of comparison firms being privately owned and further wherein said monotonic managerial compensation amount transformation is a transformation function in which positive incremental increases in said primary firm's measurement of performance results in a smaller positive increment in value of said managerial compensation amount.

7. A method of compensating a manager who exercises administrative control over operations of a primary firm for the purpose of reducing the degree to which prices exceed marginal costs in an industry, reducing incentives for industry collusion between the primary firm and a set of comparison firms in said industry, or reducing incentives for coordinated special interest industry lobbying, said set of comparison firms including at least one firm, wherein a brand-name commodity is to be produced by said primary firm, said primary firm having the manager who exercises administrative control over said primary firm's operations during a sampling period, comprising the steps of:

a) assigning a level of quality to said brand-name commodity;
   b) inducing said primary firm to supply said brand-name commodity at said level of quality;
   c) choosing an absolute performance standard;
   d) determining a performance measure for said primary firm with respect to said chosen absolute performance measure for said sampling period;
   e) determining a performance measure for each of said comparison firms for said sampling period, said performance measure for each of said comparison firms forming a set of comparison firm absolute performance measures;
   f) determining a performance comparison base based on said set of comparison firm absolute performance measures;
   g) determining a relative performance measure for said primary firm by comparing said primary firm performance measure and said performance comparison base and further determining a relative performance measure for each firm of the set of comparison firms in the industry wherein a sum of the relative performance measures for the primary firm and the set of comparison firms in the industry is equal to a fixed value;
   h) determining the managerial compensation amount derived from said relative performance measure according to a monotonic managerial compensation amount transformation; and,
   i) transferring to said manager, compensation having a value related to said managerial compensation amount.

8. A method according to claim 7 wherein step b) includes the substeps of:

i) monitoring the quality of said brand-name commodity supplied by said primary firm;
   ii) fining said primary if the quality of said brand-name commodity supplied by said primary firm falls below said level of quality assigned to said brand name, the amount of the fine being greater than an amount of reduction of cost of supply of said brand-name commodity by said firm resulting from the reduction of quality below said level of quality.

9. A method according to claim 7 wherein step b) includes the substeps of:

i) monitoring the quality of said brand-name commodity supplied by said primary firm under said brand name; and
   ii) altering the absolute performance measure of said primary firm if the quality of said commodity supplied by said primary firm falls below said level of quality assigned to said brand name, the negative value of said alteration exceeding an amount of reduction of cost of supply of said brand-name commodity by said firm resulting from the reduction of quality below said level of quality.

10. A method according to claim 7 wherein step b) includes the substeps of:

i) monitoring the quality of said brand-name commodity supplied by said primary firm;
    ii) fining said manager if the quality of said brand-name commodity supplied by said primary firm falls below said level of quality assigned to said brand name, the amount of the fine being greater than an increase in managerial compensation which would otherwise result from a reduction in the cost of supply of said brand-name commodity by said firm resulting from the reduction of quality below said level of quality.

11. A method for reducing the degree to which prices exceed marginal costs in an industry and for reducing incentives for industry collusion between a primary firm and a set of comparison firms in said industry, said set of comparison firms including at least one firm, wherein a brand-name commodity is to be produced by said primary firm, said primary firm having a manager who exercises administrative control over said primary firm's operations during a sampling period, comprising the steps of:

a) assigning a level of quality to said brand-name commodity;
    b) inducing said primary firm to supply said brand-name commodity at said level of quality by:
       1) monitoring the quality of said brand-name commodity supplied by said primary firm; and
       2) fining said primary firm if the quality of said brand-name commodity supplied by said primary firm falls below said level of quality assigned to said brand name, the amount of the fine being greater than an amount of reduction of cost of supply of said brand-name commodity by said firm resulting from the reduction of quality below said level of quality;

c) choosing a performance standard;

d) determining a performance measure for said primary firm with respect to said chosen performance measure for said sampling period;

e) determining a performance measure for each of said comparison firms for said sampling period, said performance measure for each of said comparison firms forming a set of comparison firms forming a set of comparison firm performance measures;

f) determining a weighted performance comparison base based on said set of comparison firm performance measures;

g) determining a relative performance measure for said primary firm by comparing said primary firm performance measure and said weighted performance comparison base;

h) determining a managerial compensation amount derived from said relative performance measure according to a monotonic managerial compensation amount transformation; and, i) transferring to said manager compensation having a value related to said managerial compensation amount.

12. A method for reducing the degree to which prices exceed marginal costs in an industry and for reducing incentives for industry collusion between a primary firm and a set of comparison firms in said industry, said set of comparison firms including at least one firm, wherein a brand-name commodity is to be produced by said primary firm, said primary firm having a manager who exercises administrative control over said primary firm's operations during a sampling period, comprising the steps of:

a) assigning a level of quality to said brand-name commodity;

b) inducing said primary firm to supply said brand-name commodity at said level of quality by:
1) monitoring the quality of said brand-name commodity supplied by said primary firm under said brand name; and
2) altering the absolute performance measure of said primary firm if the quality of said commodity supplied by said primary firm falls below said level of quality assigned to said brand name, the negative value of said alteration exceeding an amount of reduction of cost of supply of said brand-name commodity by said firm resulting from the reduction of quality below said level of quality;

c) choosing a performance standard;

d) determining a performance measure for said primary firm with respect to said chosen performance measure for said sampling period;

e) determining a performance measure for each of said comparison firms for said sampling period, said performance measure for each of said comparison firms forming a set of comparison firm performance measures;

f) determining a weighted performance comparison base based on said set of comparison firm performance measures;

g) determining a relative performance measure for said primary firm by comparing said primary firm performance measure and said weighted performance comparison base;

h) determining a managerial compensation amount derived from said relative performance measure according to a monotonic managerial compensation amount transformation; and, i) transferring to said manager, compensation having a value related to said managerial compensation amount.

13. A method for reducing the degree to which prices exceed marginal costs in an industry and for reducing incentives for industry collusion between a primary firm and a set of comparison firms in said industry, said set of comparison firms including at least one firm, wherein a brand-name commodity is to be produced by said primary firm, said primary firm having a manager who exercises administrative control over said primary firm's operations during a sampling period, comprising the steps of:

a) assigning a level of quality to said brand-name commodity;

b) inducing said primary firm to supply said brand-name commodity at said level of quality by:
1) monitoring the quality of said brand-name commodity supplied by said primary firm; and
2) fining said manager if the quality of said brand-name commodity supplied by said primary firm falls below said level of quality assigned to said brand name, the amount of the fine being greater than an increase in managerial compensation which would otherwise result from a reduction in the cost of supply of said brand-name commodity by said firm resulting from the reduction of quality below said level of quality;

c) choosing a performance standard;

d) determining a performance measure for said primary firm with respect to said chosen performance measure for said sampling period;

e) determining a performance measure for each of said comparison firms for said sampling period, said performance measure for each of said comparison firms forming a set of comparison firm performance measures;

f) determining a weighted performance comparison base based on said set of comparison firm performance measures;

g) determining a relative performance measure for said primary firm by comparing said primary firm performance measure and said weighted performance comparison base;

h) determining a managerial compensation amount derived from said relative performance measure according to a monotonic managerial compensation amount transformation; and, i) transferring to said manager, compensation having a value related to said managerial compensation amount.

14. A method for reducing the degree to which prices exceed marginal costs in an industry and for reducing incentives for industry collusion between a primary firm and a set of comparison firms in said industry, said set of comparison firms including at least one firm, wherein a brand-name commodity is to be produced by said primary firm and the set of comparison firms, said primary firm having a manager who exercises administrative control over said primary firm's operations during a sampling period, the method comprising the steps of:

a) choosing a performance standard from a set of performance standards;

b) measuring a performance of said primary firm with respect to said chosen performance standard for said sampling period;

c) measuring a performance of each of said comparison firms with respect to said chosen performance standard for said sampling period, said measurement of performance for each of said comparison firms forming a set of comparison firm performance measures;

d) determining a performance comparison base based on said set of comparison firm performance measures;

e) comparing said measurement of performance of said primary firm with said performance comparison base;

f) determining a relative performance measure for said primary firm based on said comparison of said primary firm measurement of performance and said performance comparison base;

g) determining a managerial compensation amount derived from said relative performance measure according to a monotonic managerial compensation amount transformation;

h) transferring compensation to said manager, said transferred compensation having a value related to said managerial compensation amount;

i) assigning a level of quality to said brand-name commodity;

j) instituting an auctioning scheme to determine a market price of said brand-name commodity and inducing the primary firm and the set of comparison firms to supply said brand-name commodity at said market price;

k) monitoring the level of quality of said brand-name commodity; and l) inducing said primary firm to supply said brand-name commodity at said level of quality by fining such manager if the quality of said commodity supplied by said primary firm falls below a level of quality assigned to the commodity, the amount of the fine being greater than an increase in managerial compensation which would otherwise result from a reduction in cost of supply of the commodity by said firm resulting from the reduction of quality below the level of quality assigned to the commodity.

15. A method of compensating a manager who exercises administrative control over operations of a primary firm for the purpose of reducing the degree to which prices exceed marginal costs in an industry, for reducing incentives for industry collusion between the primary firm and a set of comparison firms in said industry, or reducing incentives for coordinated special interest industry lobbying, said set of comparison firms including at least one firm, each comparison firm of said set of comparison firms having a respective manager who exercises administrative control over said comparison firm, said primary firm and said set of comparison firms forming a joint set of firms, at least one firm in said joint set of firms being privately owned wherein privately owned means not wholly government owned, the method comprising the steps of:

a) choosing an absolute performance standard from a set of absolute performance standards;

b) measuring a performance of said primary firm with respect to said chosen absolute performance standard for said sampling period;

c) measuring an absolute performance of each firm of said set of comparison firms with respect to said chosen performance standard for said sampling period, said measurement of performance for each of said comparison firms forming a set of comparison firm absolute performance measures;

d) determining a performance comparison base based on said set of comparison firm performance measures by calculating a weighted average of said set of comparison firm absolute performance measures;

e) comparing said measurement of absolute performance of said primary firm with said performance comparison base;

f) determining a relative performance measure for said primary firm based on said comparison of said primary firm measurement of absolute performance and said performance comparison base;

g) determining a managerial compensation amount derived from said relative performance measure according to a monotonic managerial compensation amount transformation;

h) transferring compensation to said manager, said transferred compensation having a value related to said managerial compensation amount; and i) repeating steps (a) through (h) with respect to each comparison firm of said set of comparison firms as if each of said comparison firms, in turn, was the primary firm and wherein the relative performance measures of the primary firm and the set of comparison firms defines substantially a zero sum game, wherein a monotonic managerial compensation amount transformation may be different for each manager of the joint set of firms.

* * * * *